(12) United States Patent
Jones et al.

(10) Patent No.: US 6,868,059 B1
(45) Date of Patent: Mar. 15, 2005

(54) CLUSTERS OF DEVICES, SOFTWARES AND METHODS FOR IMPROVED HANDLING OF A GATEKEEPER LOAD IN VOIP COMMUNICATION

(75) Inventors: Paul E. Jones, Apex, NC (US); Vivek Bhargava, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 822 days.

(21) Appl. No.: 09/841,754

(22) Filed: Apr. 24, 2001

(51) Int. Cl.[7] ................. G01R 31/08; H04L 12/46; H04L 12/66
(52) U.S. Cl. ............... 370/216; 370/331; 370/352; 370/401
(58) Field of Search ................ 370/260, 216, 370/328, 218, 331, 219, 389, 220, 352, 217, 353, 231, 422, 465, 466; 455/433, 436

(56) References Cited

U.S. PATENT DOCUMENTS 6,529,475 B1 * 3/2003 Wan et al. ............. 370/231
6,614,781 B1 * 9/2003 Elliott et al. ........... 370/401
6,665,293 B2 * 12/2003 Thornton et al. ........ 370/352
6,775,255 B1 * 8/2004 Roy ..................... 370/331
2002/0018476 A1 * 2/2002 Roy ..................... 370/401
2002/0101860 A1 * 8/2002 Thornton et al. ........ 370/352
2003/0007622 A1 * 1/2003 Kalmanek et al. ...... 379/219
2003/0076815 A1 * 4/2003 Miller et al. ........... 370/352
2004/0008710 A1 * 1/2004 Parra-Moyano et al. ... 370/422

OTHER PUBLICATIONS

Paul Jones, Cisco Draft H.323v2 (Including Editorial Corrections—Feb. 2001. <http://www.cisco.com/univercd/cc/td/docproduct/software/ios121/121newft.../h323v2p2.ht> viewed Apr. 10, 2001.

* cited by examiner

Primary Examiner—Duc Ho
Assistant Examiner—Phuongchau Ba Nguyen
(74) Attorney, Agent, or Firm—Marger Johnson & McCollom, PC (57) ABSTRACT

A cluster of alternate gatekeepers handles the load of a single logical zone. The alternate gatekeepers exchange signals among each other according to a special cluster protocol. Each alternate gatekeeper may be connected and exchange signals with endpoint devices.

48 Claims, 8 Drawing Sheets

| 510 | FIRST ALTERNATE GATEKEEPER RECEIVES FROM ENDPOINT DEVICE AN ENDPOINT STATUS SIGNAL |

| 520 | FIRST ALTERNATE GATEKEEPER ENCODES INDIVIDUAL STATUS INFORMATION IN CLUSTER SIGNAL |

| 530 | FIRST ALTERNATE GATEKEEPER TRANSMITS THE CLUSTER SIGNAL TO SECOND AND THIRD ALTERNATE GATEKEEPERS |

| 540 | THE SECOND ALTERNATE GATEKEEPER DECODES THE INDIVIDUAL STATUS INFORMATION FROM THE RECEIVED CLUSTER SIGNAL |

| 560 | THE THIRD ALTERNATE GATEKEEPER DECODES THE INDIVIDUAL STATUS INFORMATION FROM THE RECEIVED CLUSTER SIGNAL |

| 550 | THE SECOND ALTERNATE GATEKEEPER PROCESSES THE DECODED INDIVIDUAL STATUS INFORMATION TO UPDATE FIRST VERSION OF THE CLUSTER STATUS |

| 570 | THE THIRD ALTERNATE GATEKEEPER PROCESSES THE DECODED INDIVIDUAL STATUS INFORMATION TO UPDATE SECOND VERSION OF THE CLUSTER STATUS |

CLUSTERS OF DEVICES, SOFTWARES AND METHODS FOR IMPROVED HANDLING OF A GATEKEEPER LOAD IN VOIP COMMUNICATION

BACKGROUND OF THE INVENTION

1. Field of the Invention

The present invention is related to the field of network telephony, and more specifically to clusters of devices, softwares and methods for improved handling of a gatekeeper load in VoIP communication.

2. Description of the Related Art

Networks such as the internet or Local Area Networks (LANs) are increasingly used for telephony. Voice data is transmitted through a network as packets. When a voice call is originated using the traditional telephone technology (circuit switching), the voice data is converted to such packets by a network device called a gateway. Such gateways are considered to be endpoints of the network in question.

The packets travel through the network using a suitable Voice over Internet Protocol (VoIP). A superior VoIP protocol has proven to be the H.323 standard, which is a short notation for Recommendation H.323 of the International Telecommunications Union (ITU).

Figure 1:
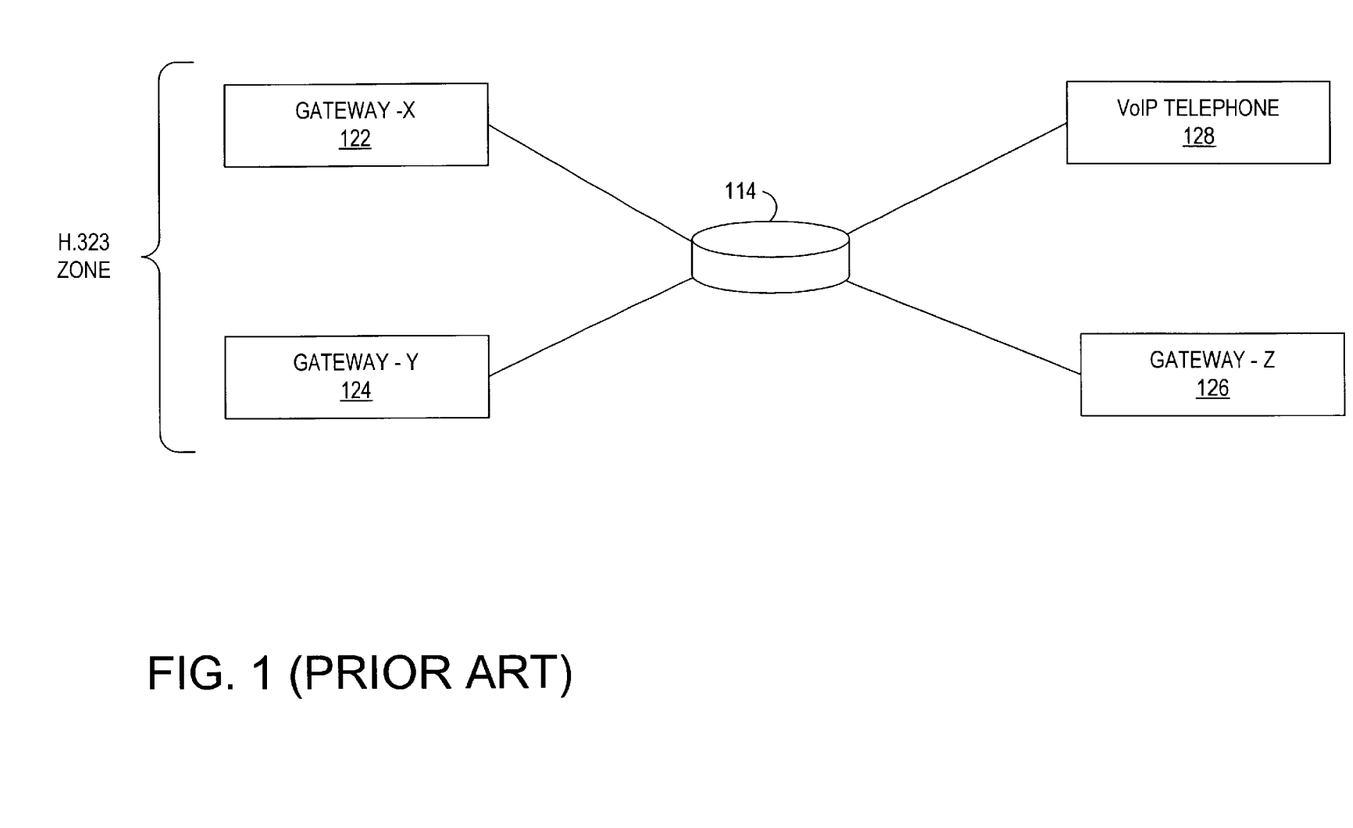
FIG. 1 is a schematic diagram of devices included in a single H.323 logical zone according to the prior art.

Referring now to FIG. 1, an operating unit of the H.323 standard is described in more detail. The operating unit is a logical zone, which is also known as a H.323 zone. The shown H.323 zone includes a gatekeeper 114, and endpoint devices 122, 124, 126, 128 coupled with gatekeeper 114.

In the example of FIG. 1, endpoint devices 122, 124, 126, 128 are Gateway-X 122, Gateway-Y 124, Gateway-Z 126, and VoIP telephone 128. Gateway-X 122, Gateway-Y 124, Gateway-Z 126 are H.323 gateways. In general a H.323 gateway is an endpoint on the H.323 zone which provides real-time, two-way communications between H.323 terminals on the H.323 zone and other ITU-T terminals in a network, or to another H.323 gateway. A H.323 gateway is specified in more detail in section 6.3 of the H.323 Standard Version 4, approved 11/2000.

The H.323 standard defines the relationship between gatekeeper 114 and endpoint devices 122, 124, 126, 128. Gatekeeper 114 exchanges signals with endpoint devices 122, 124, 126, 128 according to a protocol such as RAS (Registration Admission and Status). A H.323 gatekeeper is specified in more detail in section 6.4 of the H.323 standard draft Version 4, approved 11/2000.

More particularly, gatekeeper 114 provides address translation and controls access to the network for endpoint devices 122, 124, 126, 128. Gatekeeper 114 maintains a registry of endpoint devices 122, 124, 126, 128. Endpoint devices 122, 124, 126, 128 register with gatekeeper 114 at startup, and request admission to a call from gatekeeper 114. Gatekeeper 114 can provide additional services to endpoint devices 122, 124, 126, 128, such as bandwidth management, and locating other terminals and gateways. These services are typically provided by RAS signals.

Gatekeepers, such as gatekeeper 114, are typically made from generic, multi-purpose platforms. This is because of cost considerations, and also to accommodate the recently accomplished scalability of the H.323 Standard.

When a gatekeeper fails, its associated endpoint devices become disconnected. In other words, when gatekeeper 114 fails, endpoint devices 122, 124, 126, 128 effectively fail, even though individually they may still be functioning properly.

A problem has been that the generic, multi-purpose platforms that are typically made for asynchronous IP networks do not necessarily support well the synchronous voice communication required by VoIP protocols. Accordingly, gatekeepers in the prior art tend to fail at the rate of other IP devices. Used in network telephony, however, these failures are noticed by live users. Such prevents network telephony from being accepted as a viable alternative to circuit switched telephony.

BRIEF SUMMARY OF THE INVENTION

The present invention overcomes these problems and limitations of the prior art.

Generally, the present invention provides clusters of devices, softwares and methods for improved handling of a gatekeeper load in VoIP communication.

A cluster made according to the invention includes a number of alternate gatekeepers, which exchange signals among each other according to a special protocol. Softwares and methods of the invention ensure that the loads of the gatekeepers remain well balanced. A priority computer may store a priority table.

The invention offers the advantage that the whole system becomes more reliable due to the redundancy in gatekeepers. Even if one of the gatekeepers in the cluster fails, the remainder of the cluster continues working. In fact, one of them may be removed from service for maintenance at any time. Its active calls will be transferred to the others, thereby experiencing no disruption in service.

Importantly, the invention is transparent to the endpoint devices. The endpoints therefore need no adjustment to accommodate the invention, such as proprietary extensions and the like. Plus, the invention works independently of, and in addition to other reliability features.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides a cluster that includes a number of alternate gatekeepers. The alternate gatekeepers exchange signals among each other according to a special protocol. Softwares and methods of the invention ensure that the loads of the gatekeepers remain well balanced. The invention is now described in more detail.

Figure 2:
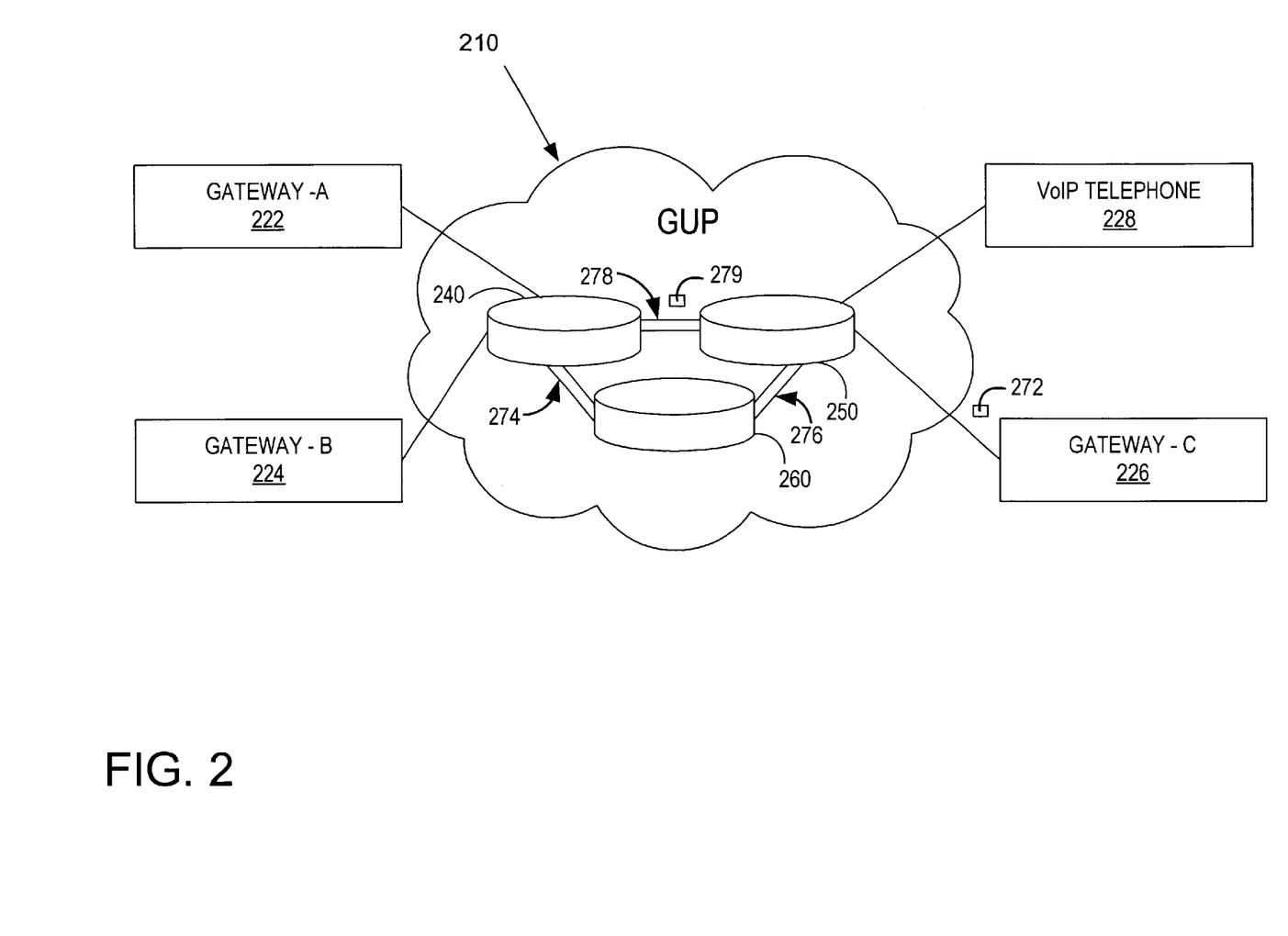
FIG. 2 is a diagram showing a cluster according to an embodiment of the invention.

Referring now to FIG. 2, a cluster 210 is provided according to an embodiment of the invention. Cluster 210 may accommodate a number of endpoint devices 222, 224, 226, 228. In the embodiment of FIG. 2, endpoint devices 222, 224, 226, 228 are Gateway-A 222, Gateway-B 224, Gateway-Z 226, and VoIP telephone 228. Gateway-A 222, Gateway-B 224, Gateway-C 226 may advantageously be H.323 gateways, as per the above. It will be appreciated that cluster 210 may, in this case, take the place of a single gatekeeper 114 of the prior art. Cluster 210 may thus perform the function of a single gatekeeper.

Cluster 210 includes a number of alternate gatekeepers 240, 250, 260. Only three alternate gatekeepers 240, 250, 260 are shown, but that is for example, and not by limitation. Each one of alternate gatekeepers 240, 250, 260 may be made as in the prior art, as adapted by the teachings of the invention.

Each one of alternate gatekeepers 240, 250, 260 is adapted to be coupled to and exchange endpoint status signals with a number of endpoints. More particularly, alternate gatekeeper 240 is coupled with Gateway-A 222 and Gateway-B 224. In addition, alternate gatekeeper 260 is coupled with Gateway-Z 226 and VoIP telephone 228.

Signals, such as signal 272, between cluster 210 and any one of endpoints 222, 224, 226, 228 are also known as endpoint status signals. It is advantageous if endpoint status signals are implemented according to a protocol such as RAS. Useful RAS signals include:

ACF—Admission Confirm
ARJ—Admission Reject
ARQ—Admission Request
GCF—Gateway Confirm
GRQ—Gateway Request
LCF—Location Confirm
LRJ—Location Reject
LRQ—Location Request
RCF—Registration Confirm
RRQ—Registration Request
RRJ—Registration Reject
URQ—Unregistration Request Cluster 210 may be formed with data transmission links 274, 276, 278. Links 274, 276, 278 may be implemented in any way known in the art, such as by electrical wires, or infrared (IR) links, or radio frequency (RF) waves, etc. Links 274, 276, 278 are for connecting alternate gatekeepers 240, 250, 260 together with each other, in a full mesh network. Accordingly, each of alternate gatekeepers 240, 250, 260 is made by adapting from what is taught in the prior art, to accommodate the teachings of the present invention. For example, alternate gatekeepers 240, 250, 260 have the proper interfaces (not shown separately) for accommodating data transmission links 274, 276, 278.

Alternate gatekeepers 240, 250, 260 are adapted to exchange cluster signals through links 274, 276, 278. Cluster signals, such as signal 279, are those signals exchanged between devices of cluster 210.

The cluster signals of the invention encode at least one of alternate gatekeeper status information and endpoint status information. The alternate gatekeeper status information is about at least one of the alternate gatekeepers 240, 250, 260 in cluster 210. Such may be alternate gatekeeper availability information, or alternate gatekeeper load condition, or both. The endpoint status information about at least one of endpoints 222, 224, 226, 228. Such may be endpoint registration status, endpoint availability status, or both.

The cluster signals of the invention are exchanged according to a special protocol. Such a protocol is hereby given the name: Gatekeeper Update Protocol (GUP).

Using GUP, each of gatekeepers 240, 250, 260 exchanges the following messages with the remaining gatekeepers in cluster 210:

a) Availability of the sending gatekeeper. The sending gatekeeper sends a periodic message to the others, informing them that it is still operating as part of the cluster.
b) Load conditions of the sending gatekeeper. The sending gatekeeper sends a periodic message to the others, informing them of its present workload. This way another gatekeeper will make a better decision whether the sending gatekeeper can accept more load if necessary.
c) Registrations and unregistrations of endpoints coupled with the sending gatekeeper. The sending gatekeeper sends a message to the others, informing them of its registrations and unregistrations. This ultimately helps determine the availability of the endpoints on the sending gatekeeper. This way the recipient may resolve an address, which would otherwise necessitate requests to both the sender and the receiver from a remote entity.
d) Resource availability of endpoints coupled with the sending gatekeeper. The sending gatekeeper sends a message to the others, informing them of the availability of endpoints registered to it.

Figure 3:
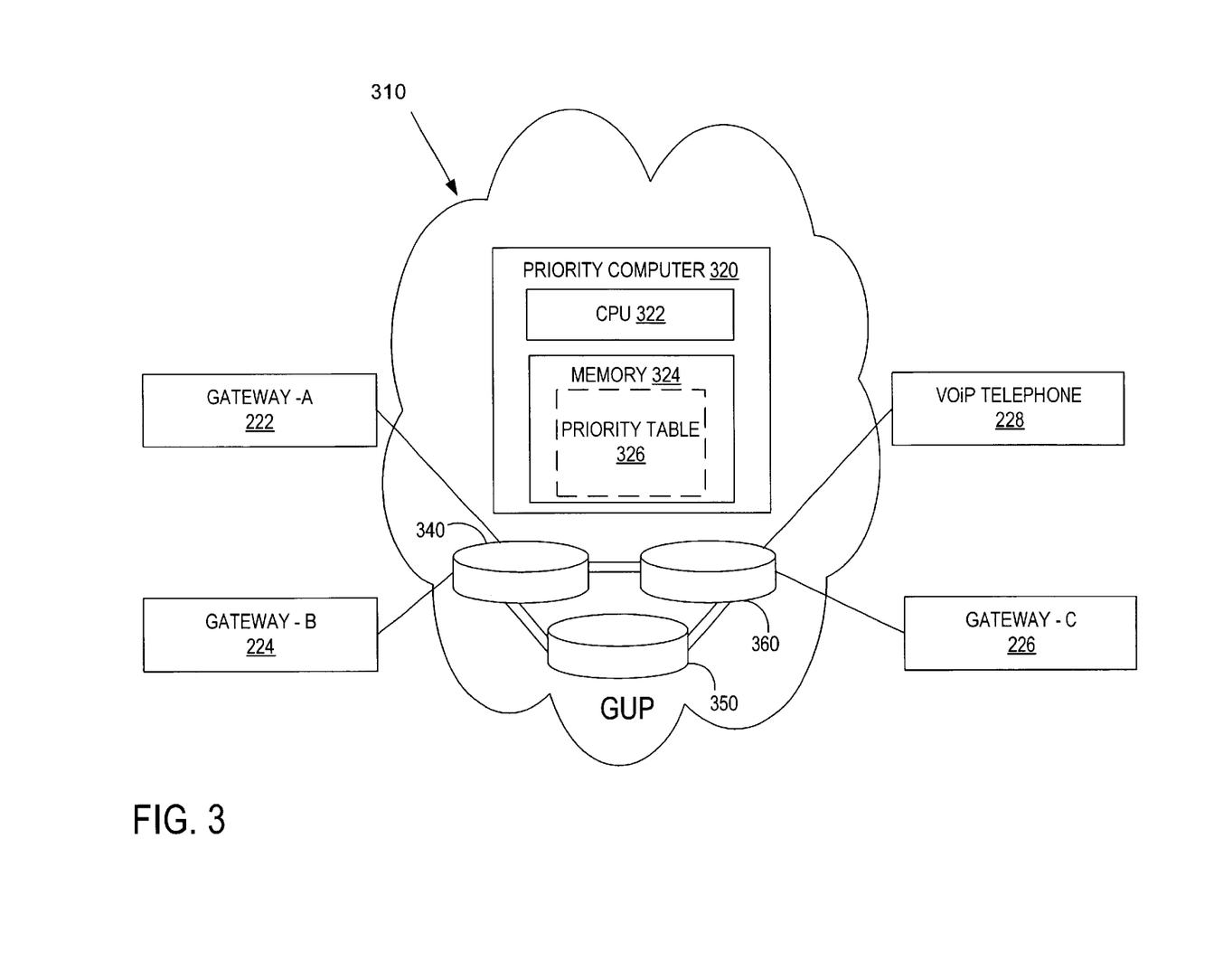
FIG. 3 is a diagram showing a cluster according to another embodiment the invention.

Referring now to FIG. 3, a cluster 310 is provided according to another embodiment of the invention. Cluster 310 includes alternate gatekeepers 340, 350, 360, operating in a GUP protocol.

Cluster 310 also includes a standalone priority computer 320. Computer 320 includes a priority processor 322 and a memory 324 coupled with processor 322. Priority processor 322 is adapted to receive the cluster signals, and to compute an evolving priority table 326 based on the received cluster signals. Memory 324 is adapted to store the computed priority table 326.

The priority table ranks alternate gatekeepers 340, 350, 360 according to their availability. The table is occasionally transmitted to endpoints 222, 224, 226, 228.

Returning briefly to the embodiment of FIG. 2, it will be recognized that each one of alternate gatekeepers 240, 250, 260 includes a processor adapted to compute an evolving priority table based on the cluster signals, and a memory adapted to store the computed priority table. As such, priority computer of FIG. 3 is not needed.

Hybrid embodiments are also possible, where for example only memory 324 is included in cluster 310. The processors of alternate gatekeepers 240, 250, 260 may compute the priority table, and store it in memory 324.

Figure 4:
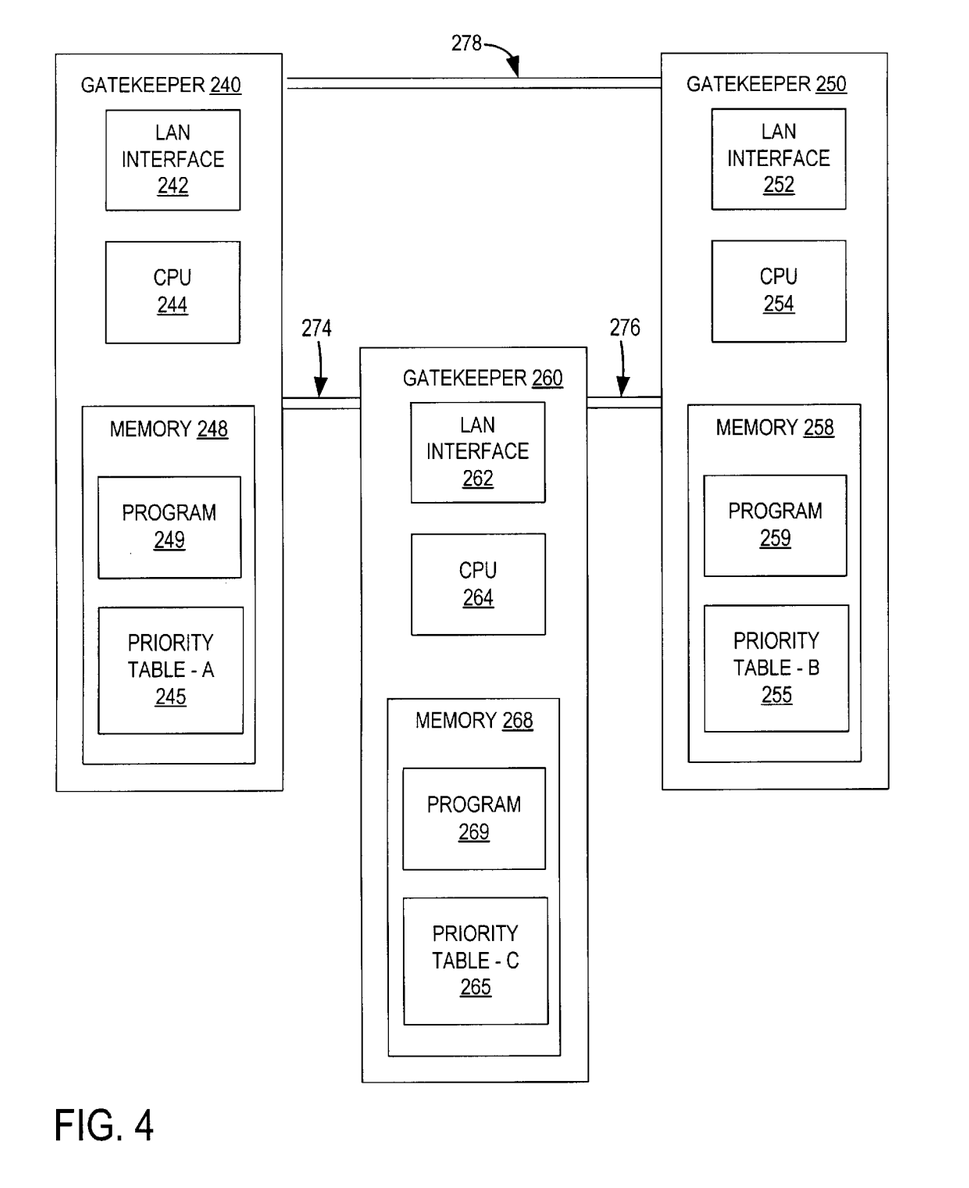
FIG. 4 is a diagram of components of the cluster of FIG. 2.

Referring now to FIG. 4, individual components are shown of alternate gatekeepers 240, 250, 260. It will be recognized that these may be made by suitably adapted low cost computers.

Gatekeeper 240 has a network interface 242 for interfacing with other devices in its cluster 210. In fact, interface 242 is preferably a Local Area Network (LAN) interface 242, since the cluster is a local connection.

Gatekeeper 240 also has a processor 244 coupled with network interface 242. Processor 244 may be implemented as a Digital Signal Processor (DSP), Central Processing Unit (CPU), or any other equivalent way known in the art.

Gatekeeper 240 additionally includes a memory 248, on which a program 249 may reside. Functions of processor 244 may be controlled by program 249, as will become apparent from the below.

In addition, a priority table 245 is also stored in memory 248. This is a first version of it, as computed by processor 244.

Gatekeeper 250 has a LAN interface 252 for interfacing with other devices in its cluster. Gatekeeper 250 also has a processor 254 coupled with network interface 252. Processor 254 may be implemented as a Digital Signal Processor (DSP), Central Processing Unit (CPU), or any other equivalent way known in the art.

Gatekeeper 250 additionally includes a memory 258, on which a program 259 may reside. Functions of processor 254 may be controlled by program 259, as will become apparent from the below.

In addition, a priority table 255 is also stored in memory 258. This is a second version of it, as computed by processor 254.

Gatekeeper 260 has a LAN interface 262 for interfacing with other devices in its cluster. Gatekeeper 260 also has a processor 264 coupled with network interface 262. Processor 264 may be implemented as a Digital Signal Processor (DSP), Central Processing Unit (CPU), or any other equivalent way known in the art.

Gatekeeper 260 additionally includes a memory 268, on which a program 269 may reside. Functions of processor 264 may be controlled by program 269, as will become apparent from the below.

In addition, a priority table 265 is also stored in memory 268. This is a first version of it, as computed by processor 264.

Another feature of the invention is the parallel computations made by certain components. For example, as seen from FIG. 4, three versions 245, 255, 265 are made of the priority table. Each gatekeeper transmits its own version to those endpoints it is coupled with. Transmission may or may not be in response to messages. For example, the priority table may be returned in GCF, RCF messages in response to GRQ, RRQ messages respectively. Plus, it may be sent in an ARJ message in response to an ARQ message, and only if it is determined that the device receiving the ARQ is loaded heavily.

In the preferred embodiment, these three versions 245, 255, 265 of the priority table are the same. Indeed, they are derived from the same inputs, and the same processing. A reality, however, is that while these three versions 245, 255, 265 are computed independently by each processor 244, 254, 264 respectively, processing may not be at exactly the same time instant. For example, one of processors 244, 254, 264 may be delayed by temporary excessive load in comparison to the others, and update its respective priority table late.

It is readily apparent that the present invention may be implemented by one or more devices that include logic circuitry. It may also be implemented by a device that includes a dedicated processor system, which may include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 5:
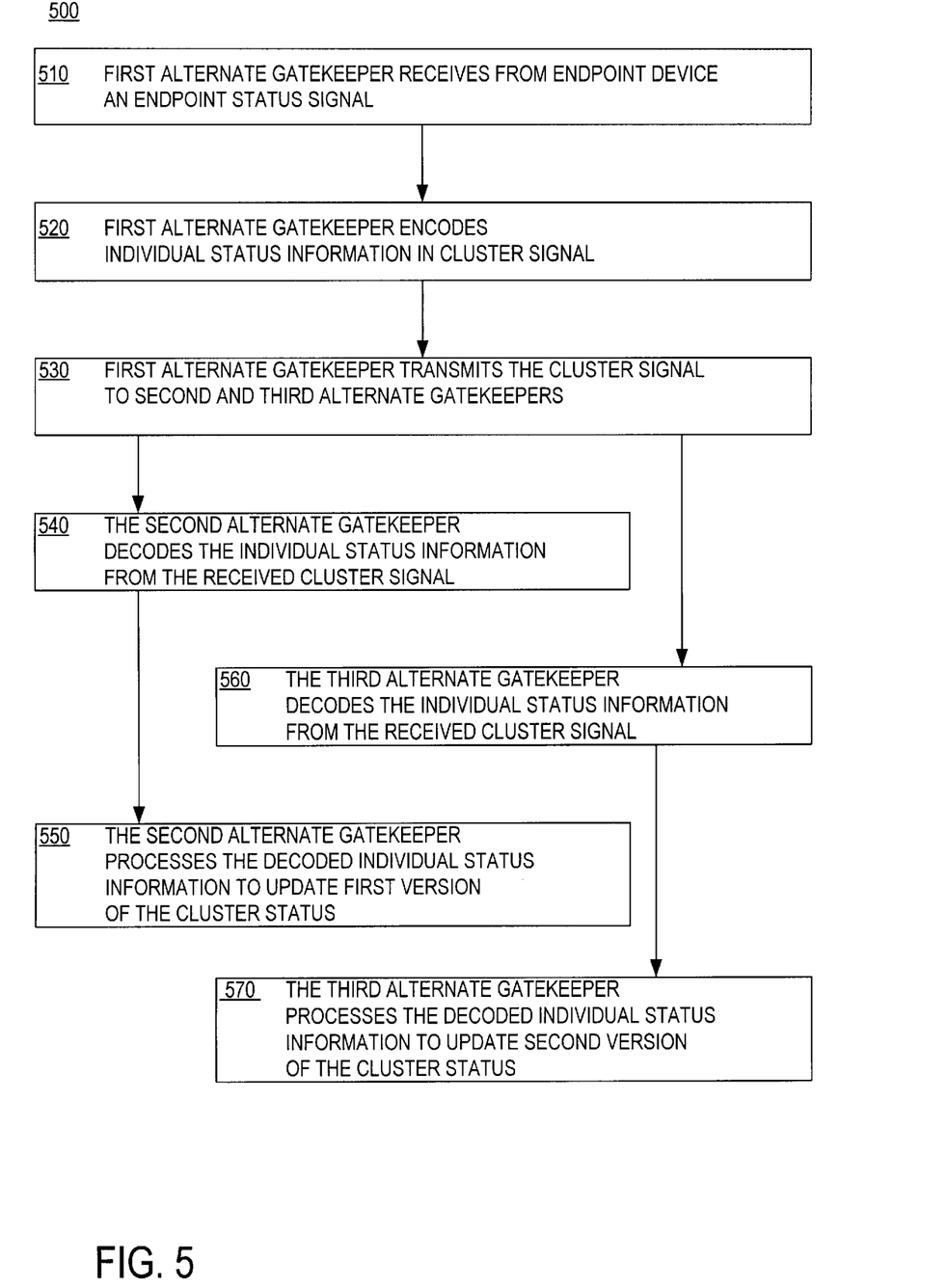
FIG. 5 is a flowchart illustrating a method of parallel processing by different alternate gatekeepers according to an embodiment of the present invention.

Referring now to FIG. 5, a flowchart 500 is used to illustrate a method according to an embodiment of the invention. The method of flowchart 500 may be practiced by a number of alternate gatekeepers working in parallel.

According to an optional box 510, a first alternate gatekeeper receives from an endpoint device an endpoint status signal. The endpoint status signal encodes status information about the endpoint device.

According to a next box 520, the first alternate gatekeeper encodes individual status information in a cluster signal. If box 510 has not taken place, the individual status information may be about the first alternate gatekeeper. For example, it may be the alternate gatekeeper availability information or the alternate gatekeeper load condition or both of the first alternate gatekeeper.

If box 510 has taken place, the individual status information may be about the endpoint device. For example, it may be the endpoint registration status, the endpoint availability status, the total capacity, the current capacity or current availability.

Availability may mean that there are not enough physical telephone lines on the endpoint available for a call. It may also mean that there is not enough CPU or memory, but such detail need not be transmitted to the alternate gatekeeper.

Capacity has two components. The total number of calls that the endpoint is capable of sustaining at any one time prior to any activity, and the total number of calls that the endpoint is capable of handling currently.

According to a next box 530, the first alternate gatekeeper transmits the cluster signal to a second and to a third alternate gatekeepers. From here on, the process splits into two (or more) parallel processes.

According to a next box 540, the second alternate gatekeeper decodes the individual status information from the received cluster signal. Then, according to a next box 550, the second alternate gatekeeper processes the decoded individual status information to update a first version of the cluster status.

The cluster status may be a parameter of the cluster as a whole. For example, it may be a priority table about a relative priority of the first, second and third alternate gatekeepers. Or it may be bandwidth utilization data of the combined first, second and third alternate gatekeepers.

In addition, according to another box 560, the third alternate gatekeeper decodes the individual status information from the received cluster signal. Then, according to a next box 570, the third alternate gatekeeper processes the decoded individual status information to update a second version of the cluster status.

It is to be observed that the second and third alternate gatekeepers compute their versions of the priority table independently of each other.

Figure 6:
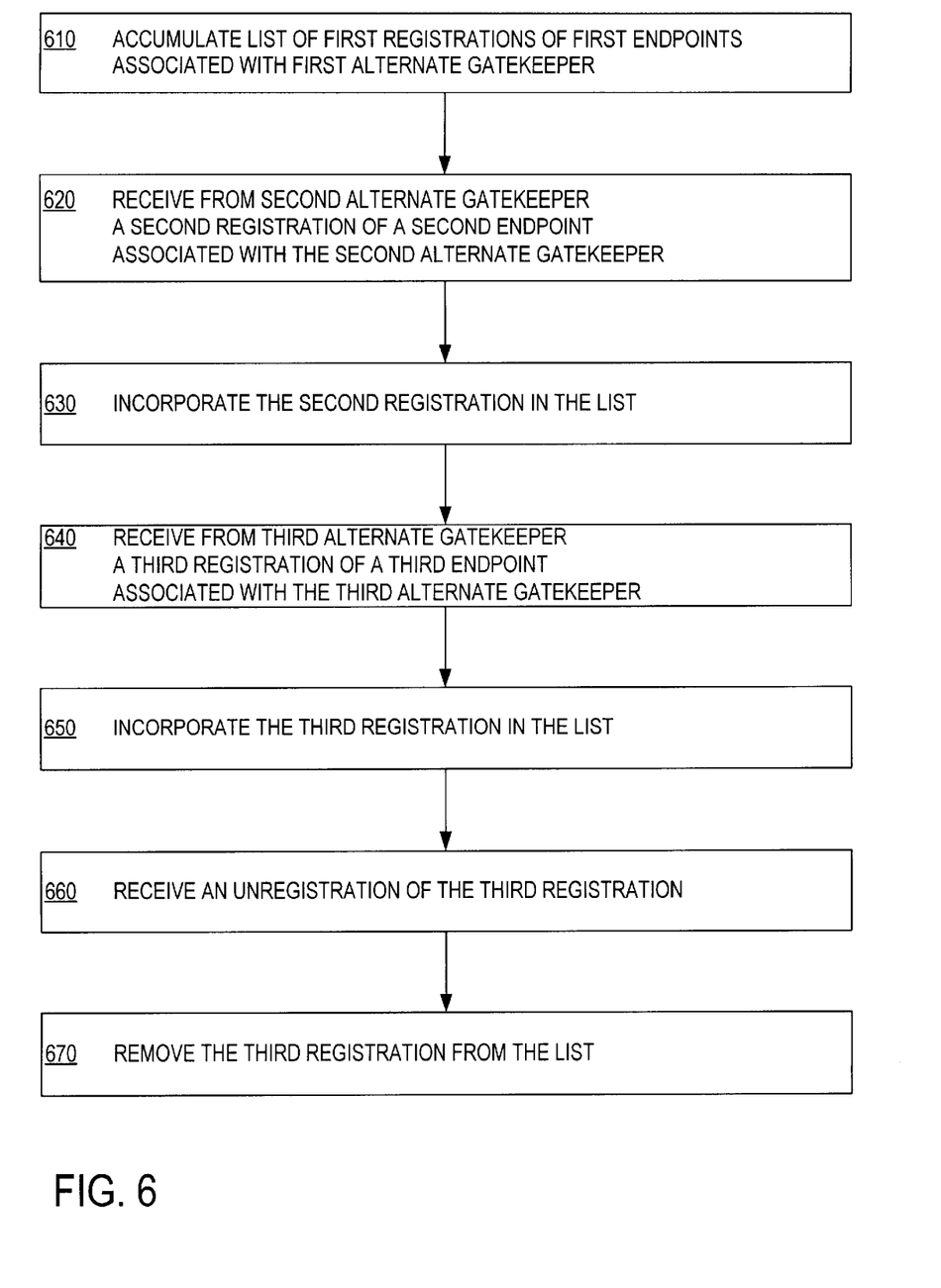
FIG. 6 is a flowchart illustrating a method of an alternate gatekeeper according to an embodiment of the present invention.

Referring now to FIG. 6, a flowchart 600 is used to illustrate a method according to another embodiment of the invention. The method of flowchart 600 may be practiced by an alternate gatekeeper in a cluster.

According to a box 610, a list is accumulated of first registrations. The first registrations are of first endpoints associated with first alternate gatekeeper.

According to a next box 620, a second registration is received from a second alternate gatekeeper. The second registration is of a second endpoint associated with the second alternate gatekeeper.

According to a next box 630, the second registration is incorporated in the list.

According to a next box 640, a third registration is received from a third alternate gatekeeper. The third registration is of a third endpoint associated with the third alternate gatekeeper.

According to a next box 650, the third registration is incorporated in the list.

According to an optional next box 660, an unregistration is received of the third registration. It may be by a URQ signal.

According to a next box 670, the third registration is removed from the list.

Figure 7:
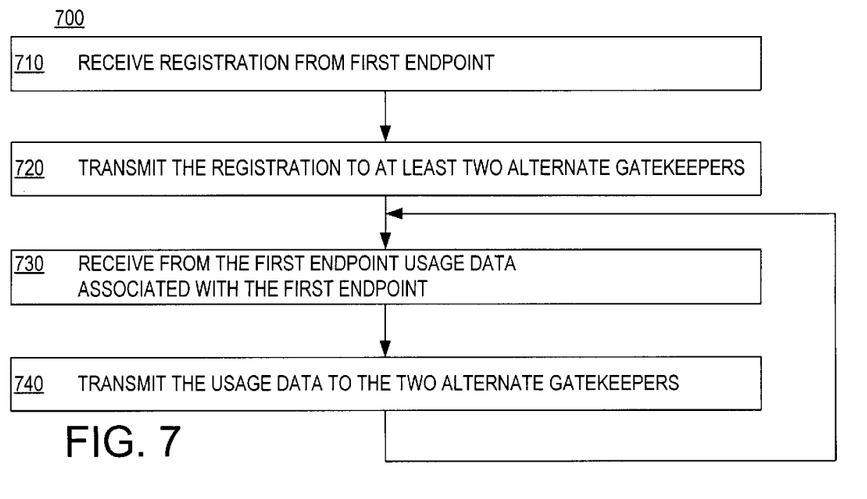
FIG. 7 is a flowchart illustrating a method of an alternate gatekeeper according to another embodiment of the present invention.

Referring now to FIG. 7, a flowchart 700 is used to illustrate a method according to yet another embodiment of the invention. The method of flowchart 700 may be practiced by an alternate gatekeeper in a cluster.

According to a box 710, a registration is received from a first endpoint.

According to a next box 720, the registration is transmitted to at least two alternate gatekeepers.

According to a next box 730, usage data is received from the first endpoint. The usage data may includes the total capacity, the current capacity and the current availability of the first endpoint.

According to a next box 740, the usage data is transmitted to the two alternate gatekeepers. Boxes 730 and 740 may be repeated.

Figure 8:
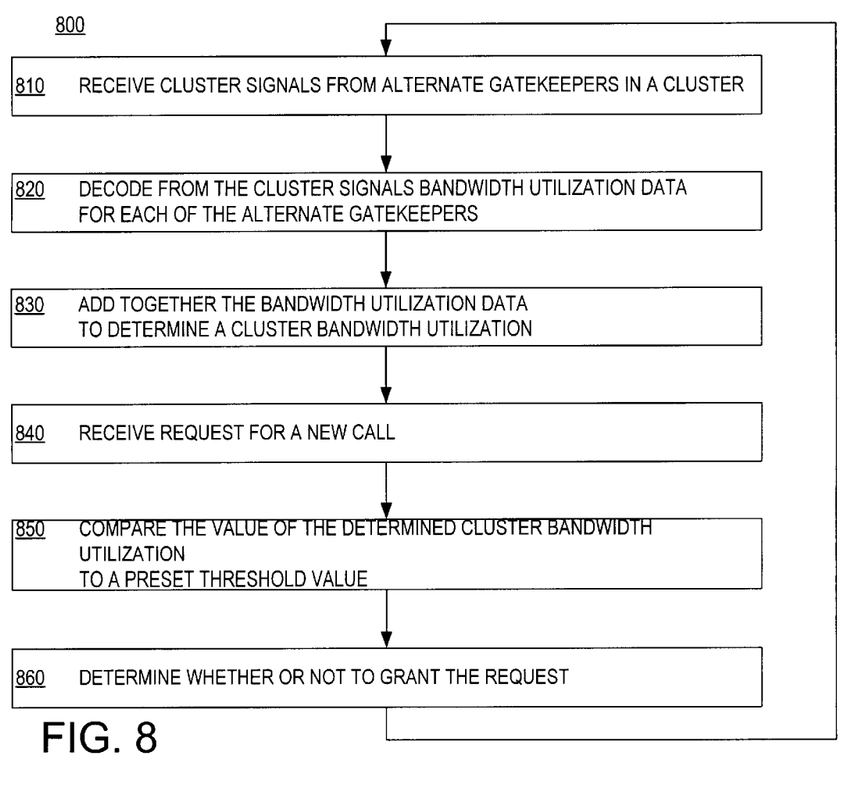
FIG. 8 is a flowchart illustrating a method of an alternate gatekeeper according to yet another embodiment of the present invention.

Referring now to FIG. 8, a flowchart 800 is used to illustrate a method according to yet another embodiment of the invention. The method of flowchart 800 may be practiced by an alternate gatekeeper in a cluster.

According to a box 810, cluster signals are received from alternate gatekeepers in a cluster.

According to a next box 820, bandwidth utilization data are decoded from the cluster signals. The bandwidth utilization data are for each of the alternate gatekeepers.

According to a next box 830, the bandwidth utilization data is added together. This determines a bandwidth utilization of the whole cluster.

According to an optional next box 840, a request is received for a new call.

According to a next box 860, it is determined whether or not to grant the request. Execution may then return to a number of the boxes, such as box 810.

In the preferred embodiment, box 860 is performed according to a box 850. The value of the determined cluster bandwidth utilization is compared to a preset threshold value.

Figure 9:
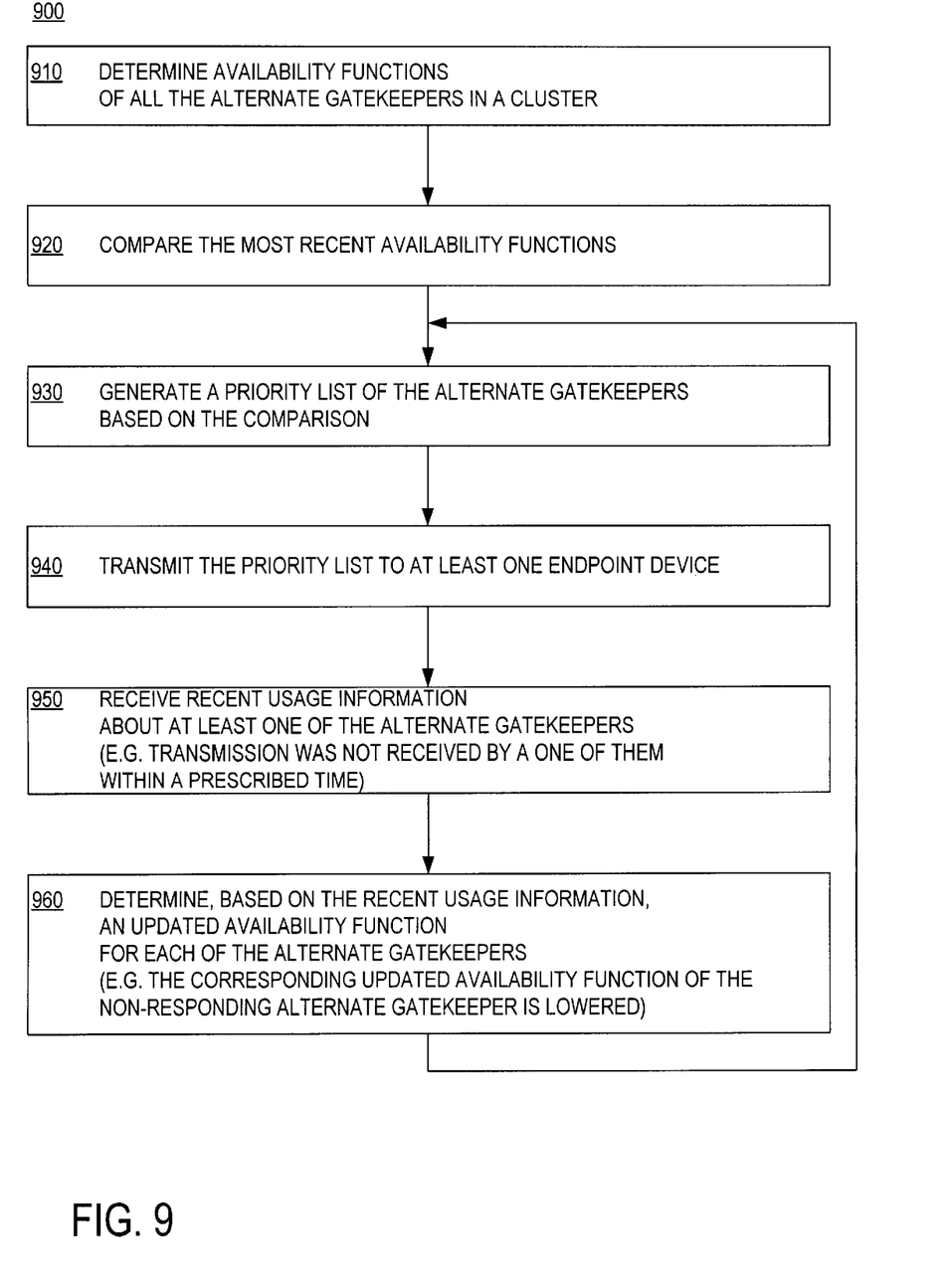
FIG. 9 is a flowchart illustrating a method of an alternate gatekeeper according to one more embodiment of the present invention.

Referring now to FIG. 9, a flowchart 900 is used to illustrate a method according to yet another embodiment of the invention. The method of flowchart 900 may be practiced by an alternate gatekeeper in a cluster.

According to a box 910, an availability function is determined of all the alternate gatekeepers in a cluster. The availability function may be determined based on a CPU utilization and a memory utilization of each one of the alternate gatekeepers. The availability functions may be computed from these parameters, so as to generate a common denominator for later comparing them.

According to a next box 920, the most recent availability functions are compared between themselves.

According to an optional next box 930, a priority list of the alternate gatekeepers is generated based on the comparison. The list may be in the form of a priority table.

According to an optional next box 940, the priority list is transmitted to at least one endpoint device. In the preferred practice, each alternate gatekeeper transmits the priority list to each endpoint device it is coupled with.

According to a next box 950, recent usage information is received about at least one of the alternate gatekeepers. Being recent, the usage information typically represents an update. Such recent usage information may be that a transmission was not received by a one of them within a prescribed time. The time may be prescribed by a conventional periodicity, or in reply to a polling message.

According to a next box 960, an updated availability function for each of the alternate gatekeepers is determined. The determination is made based on the recent usage information. For example, for the non-responding alternate gatekeeper, the corresponding updated availability function may be lowered.

Execution may then return to box 920.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a first alternate gatekeeper adapted to be coupled to at least a second alternate gatekeeper in a cluster, the first alternate gatekeeper being adapted to exchange cluster signals with the second alternate gatekeeper,
   wherein the first and the second alternate gatekeepers are adapted to be coupled to and exchange endpoint status signals with a plurality of endpoints, and
   wherein the cluster signals encode one of alternate gatekeepers status information about at least one of the alternate gatekeepers in the cluster, and endpoint status information about at least one of the, wherein the cluster signals are exchanged according to a GUP (Gatekeeper Update Protocol) protocol endpoints.

2. The cluster of claim 1, wherein
   the alternate gatekeeper status information includes at least one of alternate gatekeeper availability information and alternate gatekeeper load condition.

3. The cluster of claim 1, wherein
   the endpoint status information includes at least one of endpoint registration status and endpoint availability status.

4. The cluster of claim 1, wherein
   each of the alternate gatekeepers includes a processor adapted to compute an evolving priority table based on the cluster signals, and a memory adapted to store the computed priority table.

5. A cluster comprising:
   a plurality of alternate gatekeepers adapted to be coupled with each other through data transmission links, the alternate gatekeepers being adapted to be coupled to and exchange endpoint status signals with a plurality of endpoints,
   wherein the alternate gatekeepers are adapted to exchange through the links cluster signals which encode one of alternate gatekeeper status information about at least one of the alternate gatekeepers in the cluster, and endpoint status information about at least one of, wherein the cluster signals are exchanged according to a GUP (Gatekeeper Update Protocol) protocol the endpoints.

6. The cluster of claim 5, wherein
   the alternate gatekeeper status information includes at least one of alternate gatekeeper availability information and alternate gatekeeper load condition.

7. The cluster of claim 5, wherein
   the endpoint status information includes at least one of endpoint registration status and endpoint availability status.

8. The cluster of claim 5, wherein
   each of the alternate gatekeepers includes a processor adapted to compute an evolving priority table based on the cluster signals, and a memory adapted to store the computed priority table.

9. The cluster of claim 5,
   wherein a priority processor is adapted to receive the cluster signals, and to compute an evolving priority table based on the received cluster signals,
   and further comprising:
   a memory coupled with the priority processor, and adapted to store the computed priority table.

10. The cluster of claim 9, wherein
    the priority processor and the memory are components of a standalone priority computer.

11. A system comprising:
    a first, a second and a third alternate gatekeepers, having first, second and third processors respectively, wherein the first, the second, and the third alternate gatekeepers have interfaces for being connected together in a cluster through data transmission links,
    wherein the first processor is adapted to
    encode individual status information in a cluster signal, and transmit the cluster signal to the second alternate gatekeeper, and to third alternate gatekeeper,
    wherein the second processor is adapted to
    decode the individual status information from the received cluster signal, and process the decoded individual status information to update a first version of a cluster status,
    and wherein the third processor is adapted to
    decode the individual status information from the received cluster signal, and process the decoded individual status information to update a second version of a cluster status, wherein the cluster signal is exchanged according to a GUP (Gatekeeper Update Protocol) protocol.

12. The system of claim 11, wherein
the individual status information includes at least one of alternate gatekeeper availability information and alternate gatekeeper load condition of the first alternate gatekeeper.

13. The system of claim 11, wherein
the cluster status includes one of
a relative priority of the first, second and third alternate gatekeepers and bandwidth utilization data of the combined first, second and third alternate gatekeepers.

14. The system of claim 11, wherein the first processor is further adapted to receive from an endpoint device an endpoint status signal.

15. The system of claim 14, wherein
the individual status information includes at least one of an endpoint registration status, an endpoint availability status, a total capacity, a current capacity and a current availability of the endpoint device.

16. A priority computer comprising:
a priority processor adapted to receive cluster signals from a cluster of alternate gatekeepers that are coupled with each other through data transmission links, the alternate gatekeepers being adapted to be coupled to and exchange endpoint status signals with a plurality of endpoints, the priority processor being further adapted to compute an evolving priority table of the alternate gatekeepers based on the received cluster signals; and
a memory coupled with the priority processor and adapted to store, wherein the cluster signals are exchanged according to a GUP (Gatekeeper Update Protocol) the protocol computed priority table.

17. The priority computer of claim 16, wherein
the alternate gatekeepers are adapted to exchange through the links cluster signals which encode one of alternate gatekeeper status information about at least one of the alternate gatekeepers in the cluster, and endpoint status information about at least one of the endpoints.

18. The priority computer of claim 16, wherein
the alternate gatekeeper status information includes at least one of alternate gatekeeper availability information and alternate gatekeeper load condition.

19. The priority computer of claim 16, wherein
the endpoint status information includes at least one of endpoint registration status and endpoint availability status.

20. A device comprising:
means for receiving cluster signals from a cluster of alternate gatekeepers that are coupled with each other through data transmission links, the alternate gatekeepers being adapted to be coupled to and exchange endpoint status signals with a plurality of endpoints,
means for computing an evolving priority table of the alternate gatekeepers based on the received cluster signals; and
means for storing, wherein the cluster signals are exchanged according to a GUP (Gatekeeper Update Protocol) protocol the computed priority table.

21. The device of claim 20, wherein
the alternate gatekeepers are adapted to exchange through the links cluster signals which encode one of alternate gatekeeper status information about at least one of the alternate gatekeepers in the cluster, and endpoint status information about at least one of the endpoints.

22. The device of claim 20, wherein
the alternate gatekeeper status information includes at least one of alternate gatekeeper availability information and alternate gatekeeper load condition.

23. The device of claim 20, wherein
the endpoint status information includes at least one of endpoint registration status and endpoint availability status.

24. An article comprising: a storage medium, said storage medium having stored thereon instructions, that, when executed by at least one device, result in:
accumulating a list of first registrations of first endpoints associated with a first alternate gatekeeper;
receiving from a second alternate gatekeeper a second registration of a second endpoint associated with the second alternate gatekeeper; and
incorporating the second registration in the list.

25. The article of claim 24,
wherein the list includes a third registration of a third endpoint,
and wherein the instructions further result in:
receiving an unregistration of the third registration; and
removing the third registration from the list responsive to the unregistration.

26. An article comprising: a storage medium, said storage medium having stored thereon instructions, that, when executed by at least one device, result in:
receiving a registration from a first endpoint;
transmitting the registration to at least two alternate gatekeepers;
receiving from the first endpoint usage data associated with the first endpoint; and
transmitting the usage data to, wherein the gatekeepers communicate to each other using GUP (Gatekeeper Update Protocol) protocol the two alternate gatekeepers.

27. The article of claim 26, wherein the instructions further result in:
receiving from the first endpoint updated usage data associated with the first endpoint; and
transmitting the updated usage data to the two alternate gatekeepers.

28. The article of claim 26, wherein
the usage data includes at least one of total capacity, current capacity and current availability.

29. An article comprising: a storage medium, said storage medium having stored thereon instructions, that, when executed by at least one device, result in:
receiving cluster signals from a plurality of alternate gatekeepers in a cluster;
decoding from the cluster signals bandwidth utilization data for each of the alternate gatekeepers;
adding together the bandwidth utilization data to determine a cluster bandwidth utilization;
receiving a request for a new call; and
determining whether to grant the request depending on a value of, wherein the cluster signals are exchanged according to a GUP (Gatekeeper Update Protocol) protocol the determined cluster bandwidth utilization.

30. The article of claim 29, wherein
determining is performed by comparing the value of the determined cluster bandwidth utilization to a preset threshold value.

31. An article comprising: a storage medium, said storage medium having stored thereon instructions, that, when executed by at least one device, result in:
  determining availability functions of all the alternate gatekeepers in a cluster;
  comparing the determined availability functions;
  generating a priority list of the alternate gatekeepers based on the comparison;
  transmitting the priority list to at least one endpoint device;
  then receiving recent usage information about at least one of the alternate gatekeepers;
  determining, based on the recent usage information, an updated availability function for each of the alternate gatekeepers for which recent usage information has been received;
  then comparing again the most recently determined availability functions;
  then adjusting the priority list based on the most recent comparison; and
  retransmitting the adjusted priority list to the endpoint device.

32. The article of claim 31, wherein
  the recent usage information is that a transmission was not received by a certain alternate gatekeeper within a prescribed time, and
  the corresponding updated availability function of the certain alternate gatekeeper is lowered.

33. The article of claim 31, wherein
  the availability function is determined on at least one of a CPU utilization and a memory utilization.

34. A method comprising:
  a first alternate gatekeeper encoding individual status information in a cluster signal;
  the first alternate gatekeeper transmitting the cluster signal to a second alternate gatekeeper and a third alternate gatekeeper;
  the second alternate gatekeeper decoding the individual status information from the received cluster signal;
  the second alternate gatekeeper processing the decoded individual status information to update a first version of a cluster status;
  the third alternate gatekeeper decoding the individual status information from the received cluster signal; and
  the third alternate gatekeeper processing the decoded individual status information to update a second version of the cluster status, wherein the cluster signal is exchanged according to a GUP (Gatekeeper Update Protocol) protocol.

35. The method of claim 34, wherein
  the individual status information includes at least one of alternate gatekeeper availability information and alternate gatekeeper load condition of the first alternate gatekeeper.

36. The method of claim 34, wherein
  the cluster status includes one of
  a relative priority of the first, second and third alternate gatekeepers and
  bandwidth utilization data of the combined first, second and third alternate gatekeepers.

37. The method of claim 34, further comprising:
  the first gatekeeper receiving from an endpoint device an endpoint status signal.

38. The method of claim 37, wherein
  the individual status information includes at least one of an endpoint registration status, an endpoint availability status, a total capacity, a current capacity and a current availability of the endpoint device.

39. A method comprising:
  accumulating a list of first registrations of first endpoints associated with a first alternate gatekeeper;
  receiving from a second alternate gatekeeper a second registration of a second endpoint associated with the second alternate gatekeeper; and
  incorporating the second registration in, wherein the gatekeepers communicate to each other using GUP (Gatekeeper Update Protocol) protocol the list.

40. The method of claim 39,
  wherein the list includes a third registration of a third endpoint,
  and further comprising:
  receiving an unregistration of the third registration; and
  removing the third registration from the list responsive to the unregistration.

41. A method comprising:
  receiving a registration from a first endpoint;
  transmitting the registration to at least two alternate gatekeepers;
  receiving from the first endpoint usage data associated with the first endpoint; and
  transmitting the usage data to, wherein the gatekeepers communicate to each other using GUP (Gatekeeper Update Protocol) protocol the two alternate gatekeepers.

42. The method of claim 41, further comprising:
  receiving from the first endpoint updated usage data associated with the first endpoint; and
  transmitting the updated usage data to the two alternate gatekeepers.

43. The method of claim 41, wherein
  the usage data includes at least one of total capacity, current capacity and current availability.

44. A method comprising:
  receiving cluster signals from a plurality of alternate gatekeepers in a cluster;
  decoding from the cluster signals bandwidth utilization data for each of the alternate gatekeepers;
  adding together the bandwidth utilization data to determine a cluster bandwidth utilization;
  receiving a request for a new call; and
  determining whether to grant the request depending on a value of, wherein the cluster signals are exchanged according to a GUP (Gatekeeper Update Protocol) protocol the determined cluster bandwidth utilization.

45. The method of claim 44, wherein
  determining is performed by comparing the value of the determined cluster bandwidth utilization to a preset threshold value.

46. A method comprising:
  determining availability functions of all the alternate gatekeepers in a cluster;
  comparing the determined availability functions;
  generating a priority list of the alternate gatekeepers based on the comparison;
  transmitting the priority list to at least one endpoint device;

then receiving recent usage information about at least one of the alternate gatekeepers;

determining, based on the recent usage information, an updated availability function for each of the alternate gatekeepers for which recent usage information has been received;

then comparing again the most recently determined availability functions;

then adjusting the priority list based on the most recent comparison; and retransmitting the adjusted priority list to the endpoint device.

47. The method of claim 46, wherein the recent usage information is that a transmission was not received by a certain alternate gatekeeper within a prescribed time, and the corresponding updated availability function of the certain alternate gatekeeper is lowered.

48. The method of claim 46, wherein the availability function is determined on at least one of a CPU utilization and a memory utilization.

* * * * *

UNITED STATES PATENT AND TRADEMARK OFFICE
CERTIFICATE OF CORRECTION

PATENT NO. : 6,868,059 B1
APPLICATION NO. : 09/841754
DATED : March 15, 2005
INVENTOR(S) : Jones et al.

It is certified that error appears in the above-identified patent and that said Letters Patent is hereby corrected as shown below:

Please insert the letter --B-- in column 3, line 9 after the word "FIG. 2".

Please insert the word --endpoints-- in column 9, line 61, after the words "at least one of the".

Please delete word "endpoints" in column 9, line 63.

Please insert the words --the endpoints-- in column 10, line 21 after the words "at least one of".

Please delete the words "the endpoints" in column 10, lines 23-24.

Please delete the comma after the word "gatekeeper" in column 10, line 58.

Please insert the words --the computed priority table-- after the word "store" in column 11, line 34.

Please delete the word "the" in column 11, line 35.

Please delete the words "computed priority table" in column 11, line 36.

Please insert the words --the computed priority table-- after the word "storing" in column 11, line 61.

Please delete the words "the computed priority table" in column 11, line 63.

Please insert the words --the two alternate gatekeepers-- in column 12, line 36 after the words "usage data to".

Please delete the words "the two alternate gatekeepers" in column 12, lines 38-39.

Please insert the words --the determined cluster bandwidth utilization-- after the words "value of" in column 12, line 61.

Please delete the words "the determined cluster bandwidth utilization" in column 12, line 63.

Please insert the words --the list-- in column 14, line 12, after the words "registration in".

Please delete the words "the list" in column 14, line 14.

UNITED STATES PATENT AND TRADEMARK OFFICE
CERTIFICATE OF CORRECTION

PATENT NO. : 6,868,059 B1
APPLICATION NO. : 09/841754
DATED : March 15, 2005
INVENTOR(S) : Jones et al.

It is certified that error appears in the above-identified patent and that said Letters Patent is hereby corrected as shown below:

Please insert the words --the two alternate gatekeepers-- in column 14, line 30, after the words "usage data to".

Please delete the words "the two alternate gatekeepers" in column 14, lines 32-33.

Please insert the words --the determined cluster bandwidth utilization-- after the words "value of" in column 14, line 52.

Please delete the words "the determined cluster bandwidth utilization" in column 14, line 54.

Signed and Sealed this

Seventh Day of August, 2007

JON W. DUDAS
*Director of the United States Patent and Trademark Office*